United States Patent [19]
Kauffman et al.

[11] 3,993,427
[45] Nov. 23, 1976

[54] MOVABLE PREFORM LOCATOR AND BLOW AIR VALVE APPARATUS FOR A BLOW MOLDING MACHINE

[75] Inventors: Ivan L. Kauffman, Commerce Township, Oakland County; Barry C. Owen, Southfield, both of Mich.

[73] Assignee: Monsanto Company, St. Louis, Mo.

[22] Filed: Oct. 11, 1974

[21] Appl. No.: 513,972

[52] U.S. Cl. .................... 425/387 B; 264/94; 425/DIG. 204; 425/DIG. 216; 425/DIG. 211
[51] Int. Cl.² .................... B29C 17/02; B29C 17/07
[58] Field of Search .......... 425/DIG. 216, DIG. 204, 425/DIG. 211, 387 B; 264/94, 97

[56] References Cited
UNITED STATES PATENTS

| | | | |
|---|---|---|---|
| 3,525,123 | 8/1970 | Cines et al. | 425/DIG. 216 |
| 3,776,991 | 12/1973 | Marcus | 425/DIG. 216 |
| 3,781,395 | 12/1973 | Uhlig | 425/DIG. 216 |
| 3,850,562 | 11/1974 | Takeuchi et al. | 425/DIG. 216 |
| 3,865,530 | 2/1975 | Jesseallee et al. | 425/DIG. 216 |

FOREIGN PATENTS OR APPLICATIONS

| | | | |
|---|---|---|---|
| 9,506TA | 1972 | Japan | 425/DIG. 216 |
| 1,166,893 | 10/1969 | United Kingdom | 425/DIG. 204 |

*Primary Examiner*—Robert L. Spicer, Jr.
*Assistant Examiner*—R. J. Charvat
*Attorney, Agent, or Firm*—Michael J. Murphy

[57] ABSTRACT

A preform locator and blow air valve apparatus, for use in a stretch pin assembly in a blow molding machine that produces hollow thermoplastic articles, which functions as a positive blow air shut-off valve means in the absence of a preform in a mold assembly. A tubular valve body is mounted in a stretch pin assembly, with a longitudinally movable blow air nozzle means slidably mounted in the valve body for carrying the preform and locating and sealing the preform against a shoulder in a mold assembly on a blow molding machine. A stretch pin is slidably mounted longitudinally through the blow air nozzle means for stretching a preform mounted on the nozzle means. A blow air passage means is operatively formed through the tubular valve body and blow air nozzle means for admitting blow air under pressure into a preform located in the mold assembly, by said blow air nozzle means, for blowing the preform into a finished article. The blow air nozzle means is moved by mechanical means into an initial position for loading a preform thereon. The blow air nozzle means is movable toward the mold assembly by either a mechanical means or a pneumatic means. The blow air nozzle means is moved a first distance toward the mold to locate and seal a preform in a mold assembly, and in the absence of a preform on the blow air nozzle means, the blow air nozzle means is moved a second distance, whereby it functions as a valve to close the blow air passage means to prevent loss of high pressure blow air and the resultant high noise levels.

17 Claims, 12 Drawing Figures

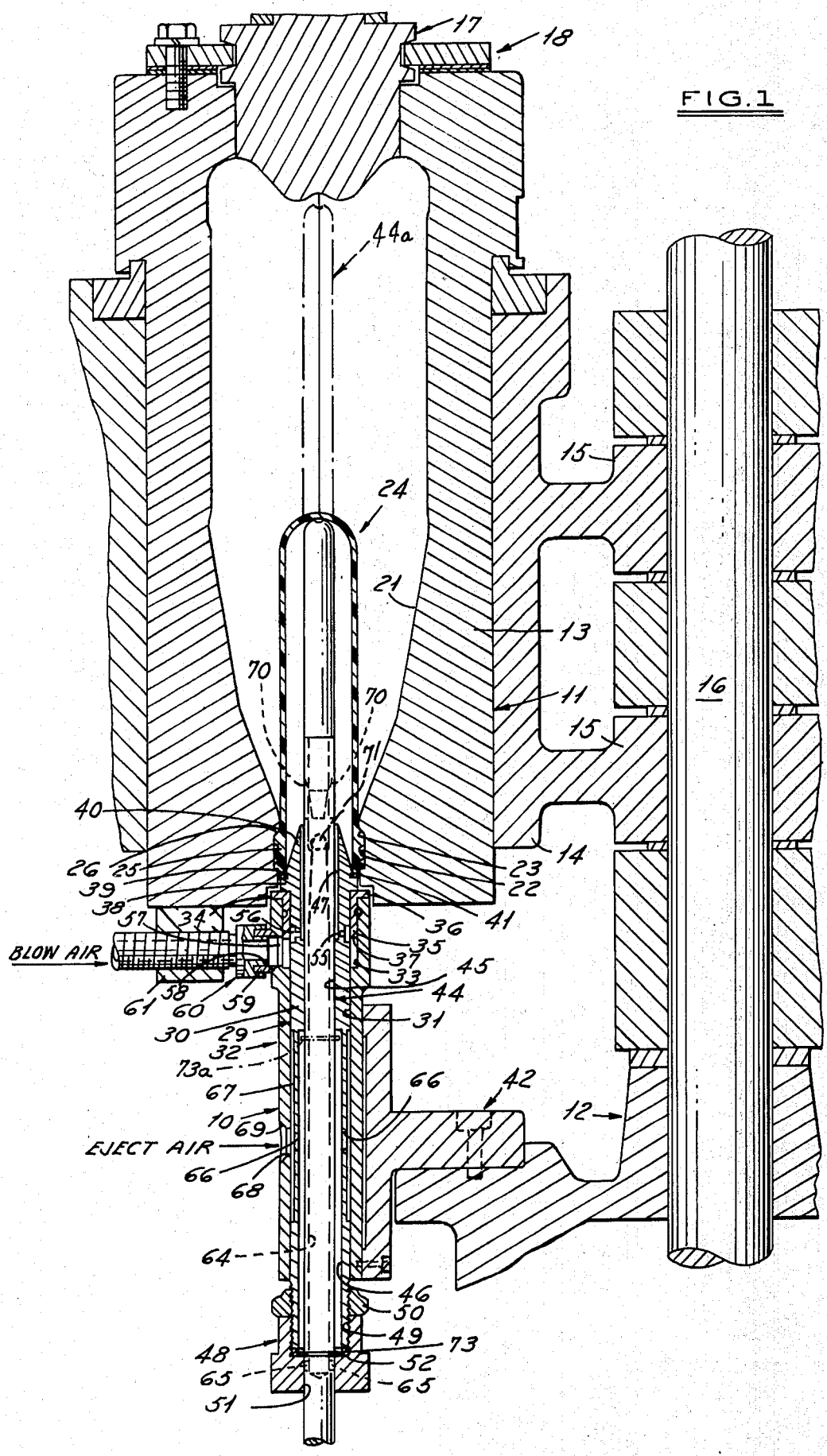

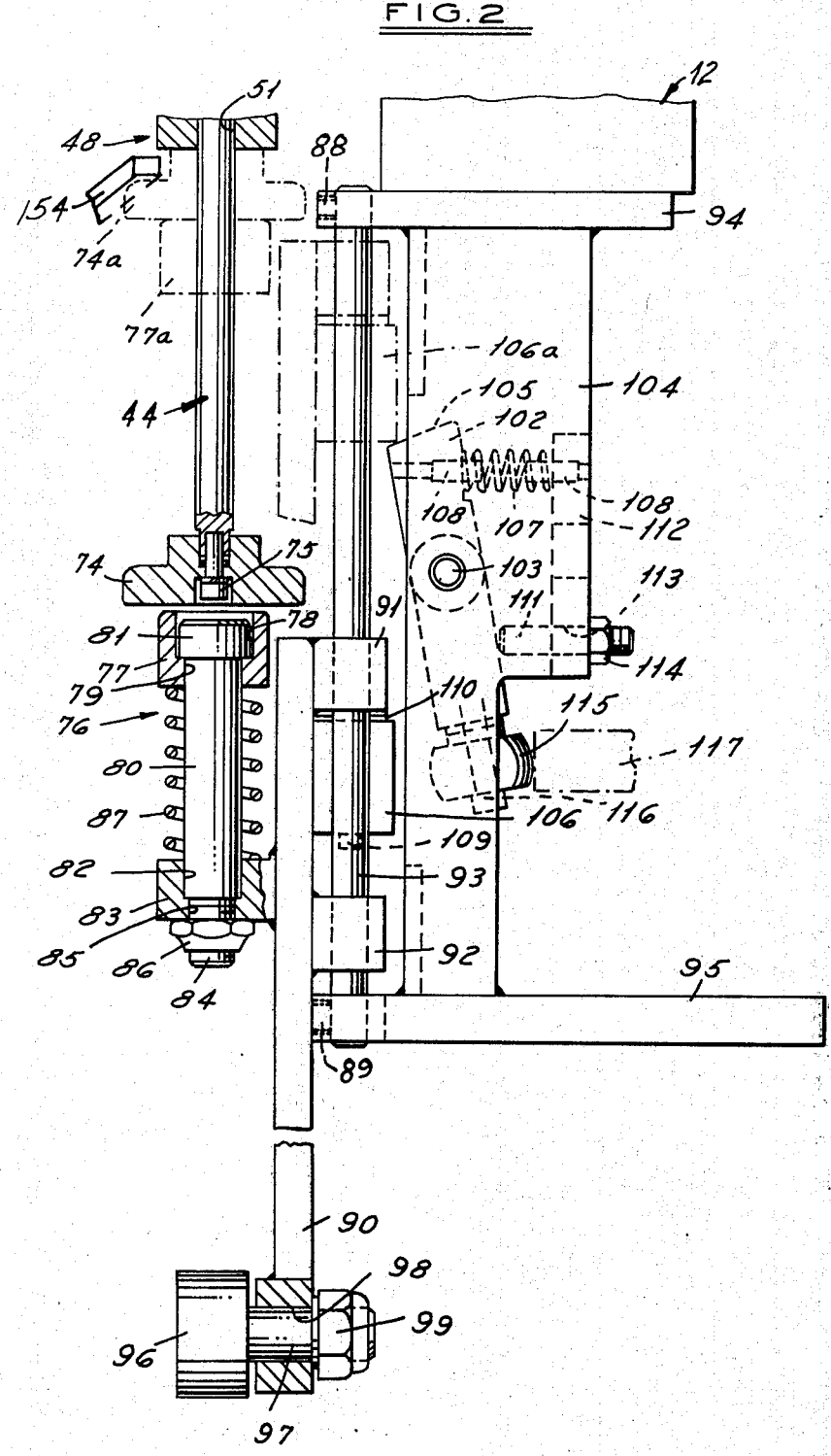

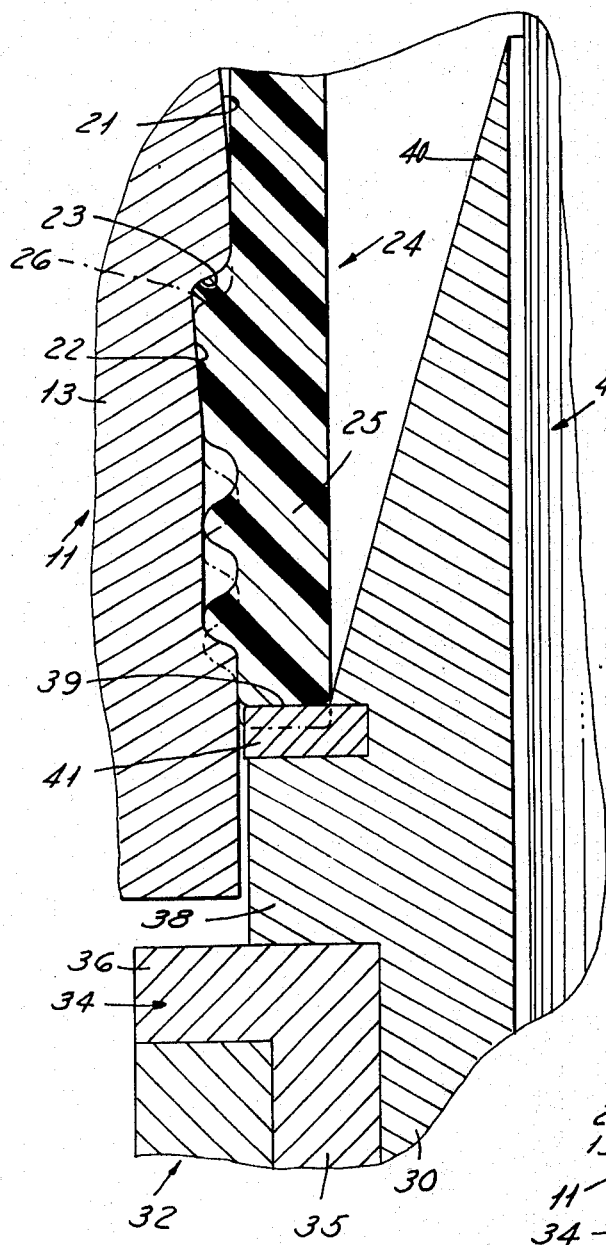
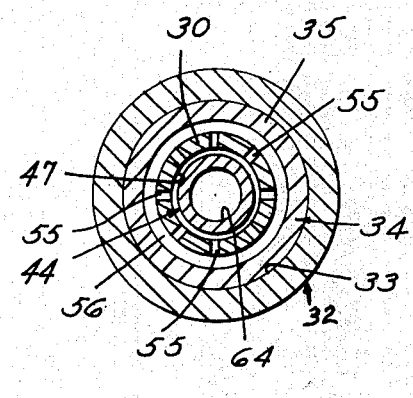
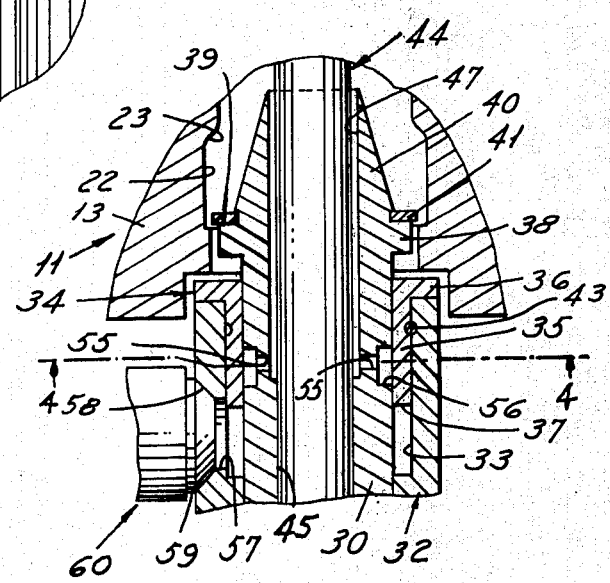

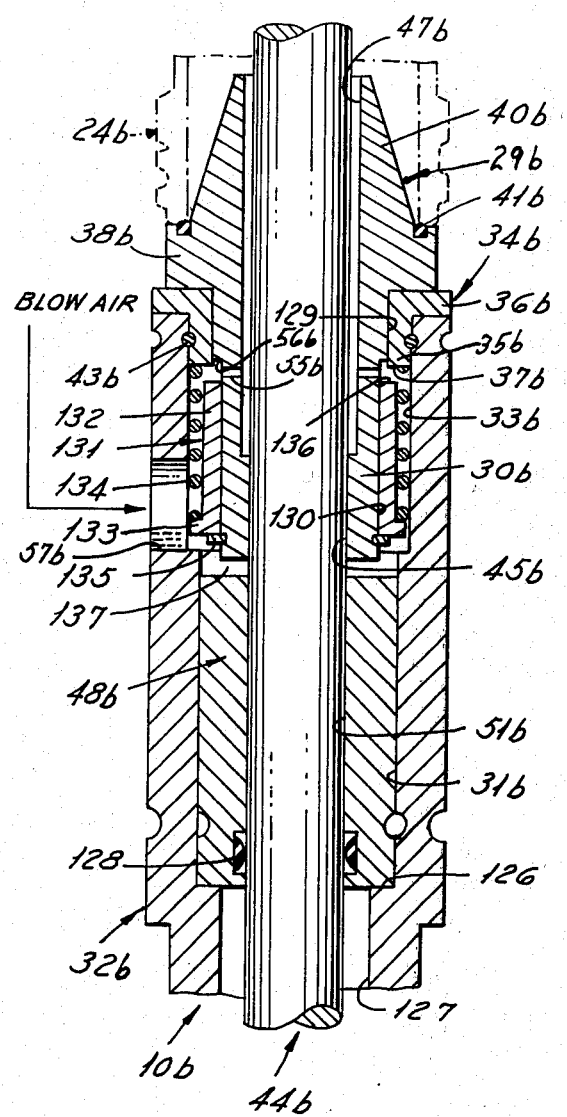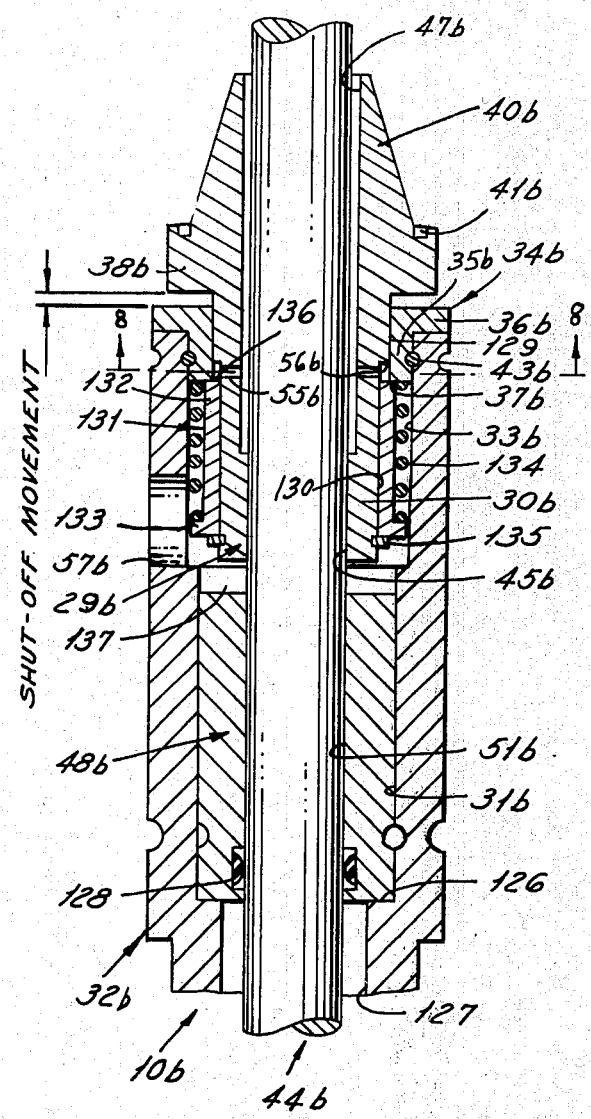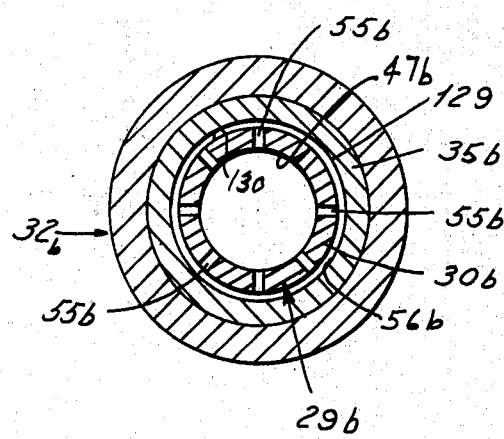

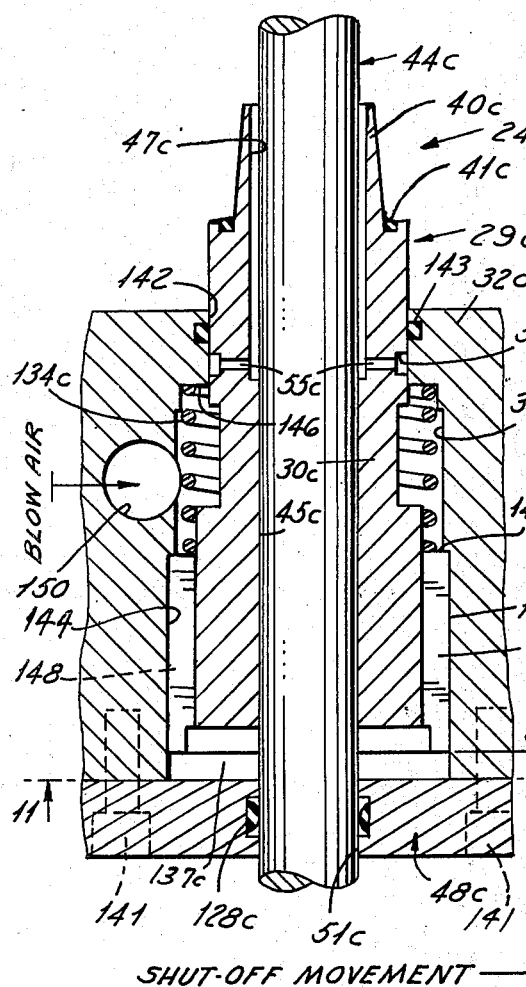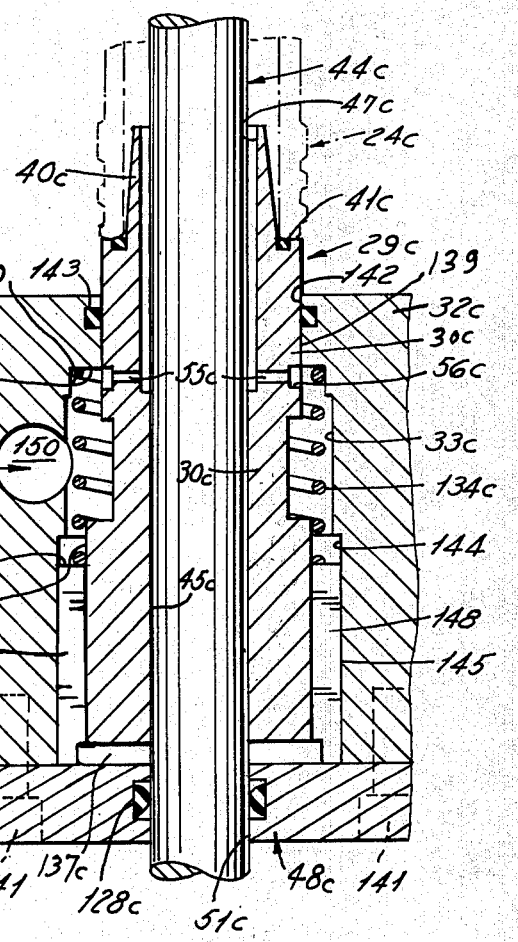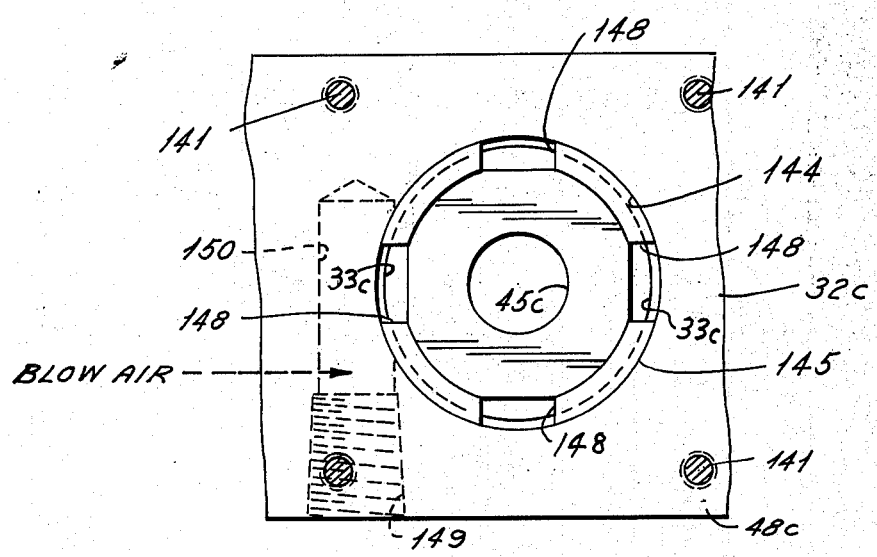

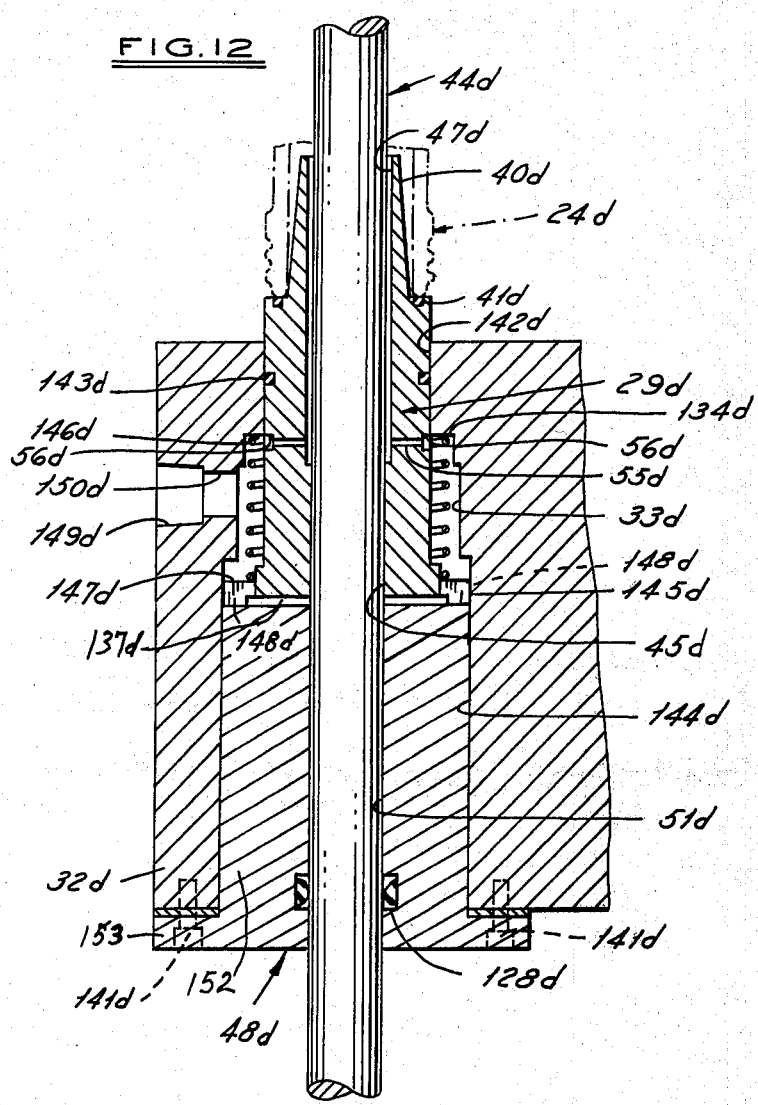

MOVABLE PREFORM LOCATOR AND BLOW AIR VALVE APPARATUS FOR A BLOW MOLDING MACHINE

SUMMARY OF THE INVENTION

This invention relates generally to the stretch blow molding art, and more particularly to a preform locator and blow air valve apparatus, for use in a stretch pin assembly for blow molding machines, to prevent loss of high pressure blow air and the resultant noise in the absence of a preform on the stretch pin assembly when it is operatively positioned with a mold assembly.

Heretofore, various types of preform locators and blow air apparatuses have been employed for use in stretch pin assemblies in a blow mold apparatus for forming hollow articles. A disadvantage of such prior art preform locator and blow air apparatuses is that there is no provision for preventing loss of high pressure blow air if a preform is not loaded on a stretch pin assembly during the preform loading operation. The absence of a preform on a stretch pin assembly does not prevent the stretch pin from carrying out its stretching movement and under such circumstances the high pressure blow air is lost and a resultant noise is produced which creates environmental problems, in that such noise reaches levels which exceed the noise level standards of the Federal Occupational Safety and Health Act.

Accordingly, in view of the foregoing, it is an important object of the present invention to provide a novel and improved preform locator and blow air valve apparatus for use in a blow molding machine stretch pin apparatus which overcomes the aforementioned disadvantages of the prior art stretch pin mold apparatuses.

It is another object of the present invention to provide a novel and improved preform locator and blow air valve apparatus for use in a blow molding machine stretch pin assembly which provides a positive shut-off of the high pressure blow air in the absence of a preform on the stretch pin assembly.

It is another object of the present invention to provide a novel and improved preform locator and blow air valve apparatus for use in a blow molding machine stretch pin assembly which prevents loss of high pressure blow air in the absence of a preform on the stretch pin assembly and eliminates the resultant noise which creates an environmental problem, in that such noise reaches levels which exceed the noise level standards of the Federal Occupational, Safety and Health Act.

It is still another object of the present invention to provide a novel and improved preform locator and blow air valve apparatus for use in a blow molding machine stretch pin assembly which functions to locate a preform in a mold assembly and to maintain an efficient seal between a blow air nozzle on a stretch pin assembly and a preform mounted thereon.

It is a further object of the present invention to provide a novel and improved preform locator and blow air valve apparatus for use in a blow molding machine stretch pin assembly which includes a movable blow air nozzle means that functions as a shut-off valve for shutting off the high pressure blow air in the absence of a preform on the blow air nozzle means, and which blow air nozzle means is movable for locating and sealing a preform in a mold assembly, or for shutting off the high pressure blow air by either a mechanical means or a pneumatic means.

It is still another object of the present invention to provide a novel and improved preform locator and blow air apparatus for use on a blow molding machine stretch pin assembly which includes a tubular valve body in said stretch pin assembly, a longitudinally movable blow air nozzle means slidably mounted in said valve body for carrying a preform and locating and sealing a preform against a shoulder in the mold assembly, a blow molding stretch pin movably mounted longitudinally through said blow air nozzle means for stretching a preform mounted on said blow air nozzle means, a blow air passage means operatively formed through said tubular valve body and blow air nozzle means for admitting blow air under pressure into a preform on said blow air nozzle means in said mold assembly for blowing the preform into a finished article, means for longitudinally moving said blow air nozzle means in said tubular valve body in one direction into an initial position at which a preform is loaded onto the blow air nozzle means, and means for longitudinally moving said blow air nozzle means in said tubular valve body in the opposite direction a first distance to locate and seal a preform carried thereon against said shoulder in the mold assembly, and for longitudinally moving said blow air nozzle means a second distance in said opposite direction beyond said first distance for shutting off said blow air passage means in the absence of a preform on the blow air nozzle means during operation of the blow molding machine.

Other features and advantages of this invention will be apparent from the following detailed description, appended claims, and the accompanying drawings.

BRIEF DESCRIPTION OF THE DRAWINGS

FIG. 1 is an elevational, section view of a movable preform locator and blow air valve apparatus, made in accordance with the principles the present invention, and showing said apparatus in an operative position in a blow mold assembly on a blow molding machine.

FIG. 2 is a fragmentary, elevational view, with parts broken and parts in section, of a mechanical apparatus for operating the preform locator and blow air apparatus illustrated in FIG. 1.

FIG. 3 is a fragmentary, enlarged, elevational section view of a preform and air nozzle apparatus employed in the present invention, and showing the preform in an initial position when the mold assembly is closed and in a moved position against the mold shoulder after the mold assembly is closed.

FIG. 4 is a horizontal, section view of the air nozzle and blow air valve structure shown in FIG. 5, taken along the line 4—4 thereof, and looking in the direction of the arrows.

FIG. 5 is a fragmentary, enlarged, elevational section view of the preform locator and blow air valve apparatus of FIG. 1, and showing the valve apparatus moved to a closed position due to the absence of a preform.

FIG. 6 is an elevational, section view of a second embodiment of the invention which comprises a preform locator and blow air valve apparatus that is air-operated.

FIG. 7 is a view similar to FIG. 6, but showing the blow air valve apparatus moved to a closed position by blow air, due to the absence of a preform.

FIG. 8 is a horizontal, section view of the structure illustrated in FIG. 7, taken along the line 8—8 thereof, and looking in the direction of the arrows.

FIG. 9 is an elevational, section view of a third embodiment of the invention which comprises a preform locator and blow air apparatus that is air-operated.

FIG. 10 is a view similar to FIG. 9, but showing the blow air valve apparatus moved to a closed position by blow air, due to the absence of a preform.

FIG. 11 is a horizontal section view of the structure illustrated in FIG. 10, taken along the line 11—11 thereof, and looking in the direction of the arrows.

FIG. 12 is a fourth embodiment of the invention, showing a preform locator and blow air valve apparatus which is air operated.

DESCRIPTION OF THE PREFERRED EMBODIMENTS

The preform locator and blow air valve apparatus of the present invention is adapted for use in a blow molding machine that produces hollow thermoplastic articles, such as bottles and the like. The preforms employed are made from suitable thermoplastic resins, as, for example, polymers and copolymers of polypropylene. An illustrative blow molding machine in which the present invention may be employed is illustrated and described in a copending U.S. patent application entitled "Rotary Stretch Blow Molding Apparatus", filed Nov. 14, 1973, Ser. No. 415,851, which is owned by the assignee of the present application.

A first embodiment of the invention, which is mechanically operated, is illustrated in FIGS. 1 through 5. The numeral 10 in FIG. 1 generally designates a preform locator, blow air valve and stretch pin apparatus which is adapted to operate with a blow mold assembly generally indicated by the numeral 11. The blow mold assembly 11 is illustrative of the mold assembly that is operatively mounted at each of a plurality of molding stations 12 in a blow molding machine of the type described and illustrated in the aforementioned copending U.S. application. The blow molding assembly 11 is also shown in detail in said aforementioned copending application, and it comprises a multi-piece mold which includes a pair of mold halves 13, one of which is shown and designated by the numeral 13. Each of the molds 13 is supported on a suitable mold carrier 14 which is swingably mounted by a pair of hubs 15 on a vertical support shaft 16, for movement between the open and closed positions. The blow mold assembly 11 also includes a mold end plug, generally designated by the numeral 17, which is secured in the molding position when the mold assembly 11 is in the closed position by suitable clamp means, generally indicated by the numeral 18. The illustrated blow molds 13 each include a first mold cavity 21 for forming the body portion of a bottle. The blow molds 13 each include a second mold cavity 22 which forms the neck portion of a bottle. As shown in FIG. 3, a preform locating shoulder 23 is formed in each of the molds 13 at the junction point between the first mold cavity body portion 21 and the second mold cavity neck portion 22.

As shown in FIGS. 1 and 3, the numeral 24 generally designates a preform which is substantially test-tube shaped. The preform 24 has a closed end and an open end around which is formed a thread to provide a neck portion that has a shoulder 26 around the inner end of said thread.

FIG. 1 illustrates the incorporation of the first embodiment of the invention in a stretch pin assembly at a molding station of the aforementioned rotary stretch blow molding apparatus. The number 29 generally designates a blow air nozzle which is provided with a cylindrical body 30. The blow air nozzle body 30 is slidably mounted for longitudinal movement in the bore 31 of a vertically disposed tubular valve body 32. The upper end of the valve body bore 31 is enlarged, as indicated by the numeral 33. A nozzle guide bushing, generally indicated by the numeral 34, has a cylindrical body portion 35 mounted in the bore 33, and a transverse flange portion 36 seated against the upper end face of the valve body 32. The inner end of the bushing body portion 35 is indicated by the numeral 37.

The upper end of the blow air nozzle body 30 is provided with an integral, outwardly extended, peripheral flange 38 which has an upper face 39 that forms a shoulder on which is seated a seal 41. The numeral 40 designates a conical nozzle nose which is formed on the upper end of the nozzle body 30, above the seal 41. The nozzle guide bushing 34 is retained in position in the upper end of the valve body 32 by a press fit. The valve body 32 is fixed by any suitable means, as by suitable machine screws, to a valve body bracket 42 that is secured to the particular blow molding station structure by any suitable means, as by suitable machine screws.

As shown in FIG. 1, a suitable stretch pin, indicated by the numeral 44, is slidably mounted in the axial bore 45 formed through the blow air nozzle body 30. The numeral 44a shows the stretch pin 44 moved inwardly of the mold assembly 11 during a stretch blow molding operation.

The lower end of the bore 45 is enlarged as indicated at 46 to form an eject air chamber in the nozzle body 30. The upper end of the bore 45 is also enlarged as indicated by the numeral 47 to form an annular passage around the stretch pin 44 for the passage of blow air into a preform 24 during a blow molding operation.

As shown in FIG. 1, the lower end of the nozzle body 30 is threaded on its outer periphery, and it has threadably mounted thereon a stretch pin guide bushing, generally indicated by the numeral 48. The upper end of the guide bushing 48 is provided with a threaded bore 49 that threadably receives the lower threaded end of the nozzle body 30 and a closed lower end which is provided with an axial bore 51 through which is slidably mounted the stretch pin 44. The stretch pin guide bushing 48 is locked in place by a suitable lock nut 50. A spacer member 52 is mounted between the lower end of the nozzle body 30 and the closed end of the bushing 48. The stretch pin 44 is guided at its upper end by the bore 45 in the nozzle body 30 and at its lower end by the bore 51 in the bushing 48.

As shown in FIGS. 1 and 4, the blow air annular passage 47 communicates with the bore 33, when the blow air nozzle 29 is in the normal operating position of FIG. 1, through a plurality of transverse passages 55 and an annular groove 56. In the event that a preform 24 is not mounted on the blow air nozzle 29, the nozzle body 30 is moved upwardly to the position shown at FIG. 5, whereby the nozzle body 30 functions as a valve to shut off communication between the annular groove 56 and the chamber formed between the nozzle body 30, the bore 33 and the lower end 37 of the bushing flange 34.

Blow air is supplied to the last mentioned chamber formed by the bore 33 through a blow air fitting, generally indicated by the numeral 60 in FIGS. 1 and 5. The blow air fitting 60 is connected to a suitable supply of air under pressure and is operatively mounted on a carrier bracket 61 which is carried on the mold assembly 11. The fitting 60 has a suitable seal 59 on the outer end thereof which is adapted to be seated in a chamfered bore 58 formed in the valve body 32. The chamfered bore 58 communicates through a bore 57 with the bore 33.

The stretch pin 44 is supplied with transfer or eject air under pressure from a suitable source through the chamfered inlet port 69 and the bore 68. The bore 68 communicates with an annular, longitudinally extended groove 67 formed around the outer periphery of the nozzle body 30. The groove 67 communicates through a plurality of transverse bores 66 with the enlarged bore 46 formed axially in the nozzle body 30. As shown in FIG. 1, the stretch pin 44 is provided with a plurality of transverse holes 65 which communicates the bore 46 in the nozzle body 30 with an axial bore 64 formed in the stretch pin 44.

The upper end of the stretch pin 44 is solid, as shown in FIG. 1. The lower end of the axial bore 64 in stretch pin 44 is closed by the lower solid end of the stretch pin 44. The upper end of the stretch pin bore 64 communicates through passages 70 with the interior of a preform 24 mounted in an inverted position on the nozzle 29 as shown in FIG. 1. A ball check valve 71 in the axial bore 64 restricts passage of the blow air out through the bore 64 during an article blowing operation. The stretch pin 44 is retained within the nozzle body 30 by a releasable retainer ring 73 which seats against the inner closed end of the bore 49 in the bushing 48 when the stretch pin 44 is retracted to the position shown in FIG. 1. When the stretch pin 44 is moved upwardly to the position shown in FIG. 1 by the numeral 44a, the retainer ring 73 is moved upwardly to the broken line position indicated by the retainer ring 73a.

The stretch pin 44 may be moved upwardly to the broken line raised position 44a of FIG. 1 by any suitable mechanical actuator means. A suitable mechanical actuator means is shown and described in detail in the aforementioned copending application entitled "Rotary Stretch Blow Molding Apparatus", and it is also briefly disclosed in FIG. 2 hereof. As shown in FIG. 2, a cylindrical, T-shaped push block 74 is fixedly mounted on the lower end of the stretch pin 44 by a suitable machine screw 75. The numeral 76 in FIG. 2 generally designates the stretch pin actuator means which includes a cylindrical bumper or lift member 77 for engagement with the stretch pin push block 74. The numerals 74a and 77a in FIG. 2 show the block 74 and bumper 77, respectively, moved to a raised operative position when the stretch pin 44 is moved upwardly to the raised operative position 44a of FIG. 1.

As shown in FIG. 2, the lift member 77 is provided on the upper end thereof with an enlarged bore 78 that communicates with a reduced diameter bore 79 that is formed through the lower end of the lift member 77.

A shaft 80 is slidably mounted through the reduced lift member bore 79 and it is provided on the upper end thereof with an enlarged cylindrical head 81 that is slidably seated in the enlarged bore 78. The shaft 80 is provided with a reduced diameter, threaded lower end 84 which is threadably mounted in a threaded bore 85 formed in a carrier bar 83. A portion of the shaft 80 which is above the threaded lower end 84 is seated in an enlarged bore 82 in the carrier bar 83.

The shaft 80 is secured in place on the carrier bar 83 by a suitable lock nut 86. A coil spring 87 is operatively mounted around the shaft 80 with its lower end seated on the upper surface of the carrier bar 83 and with its upper end seated against the lower side of the lift member 77. The spring 87 normally biases the lift member 77 into seating engagement against the lower side of the shaft head 81. The lift member 77 functions as a lift block for engagement with the stretch push block 74 which lifts the stretch pin 44 upwardly. The spring 87 provides a controllable upward spring pressure or bias on the stretch pin 44, since the shaft head 81 is normally seated within the bore 78 in the lift block 77 so as to permit the lift block 77 to move axially on the shaft 80.

As shown in FIG. 2, the carrier bar 83 is fixedly mounted, as by welding, on a cam carrier bar 90. The cam carrier bar 90 is fixedly connected, as by welding, to a pair of vertically spaced apart, horizontal slide bars 91 and 92. Each of the horizontal slide bars 91 and 92 is slidably mounted on a pair of vertically disposed, laterally spaced apart and aligned slide shafts 93. The upper ends of the slide shafts 93 are fixedly secured in an upper mounting plate 94 by any suitable means, as by set screws 88. The mounting plate 94 is fixedly secured by any suitable means to the molding station support structure 12. The lower ends of the slide shafts 93 are fixedly secured, by any suitable means, as by set screws 89, to a lower mounting plate 95, which is spaced downwardly from the upper mounting plate 94. A cam follower roller 96 is rotatably mounted on the lower end of the cam carrier bar 90. The cam carrier bars 90, 91 and 92 form a slide that carries the cam follower 96 and the aforedescribed spring pressure means for lifting the stretch pin 44. The cam follower roller 96 is rotatably supported on a shaft 97 which is operatively mounted in a transverse bore 98 that is formed through the lower end of the cam follower bar 90. The shaft 97 is secured in place by a suitable lock nut 99.

FIG. 2 shows a spring biased latch means which is adapted to releasably retain the stretch pin 44 in a fully elevated blow molding position, as illustrated by the broken line position 44a in FIG. 1. THe spring biased latch means includes a slide latch member 102 which is pivotally mounted on a horizontal pivot pin 103. The pivot pin 103 is operatively mounted between a pair of vertical, laterally spaced apart support plates 104. The lower ends of the support plates 104 are fixed, as by welding, to the lower mounting plate 95. The upper ends of the support plates 104 are fixed, as by welding, to the upper mounting plate 94.

The spring latch means includes a striker plate 106 which is horizontally mounted on the lower side of the upper slide bar 91 by a pair of suitable machine screws 109, and a plurality of suitable shims 110. The shims 110 permit adjusting of the striker plate 106 upwardly or downwardly to a desired position to control the pressure of spring 87 on the stretch pin 44. As shown in FIG. 2, the underside of the striker plate 106 is adapted to be engaged by the upper end 105 of the pivotally mounted latch member 102 when the slide that carries the cam follower 96 is raised upwardly so as to move the striker plate 106 to the broken line position indicated by the numeral 106a.

As shown in FIG. 2, the latch member 102 is normally biased counterclockwise to bring the latch member upper end 105 under the striker plate 106, by means of a suitable coil spring 107 which is operatively mounted on a pair of aligned, spaced apart spring support rods 108. One of the spring support rods 108 is fixedly mounted in a suitable bore in the rear upper face of the latch member 102 and the other spring support rod 108 is fixedly mounted in a suitable bore in a vertical retainer plate 112 which is fixedly secured between the two vertical support plates 104.

As viewed in FIG. 2, the counterclockwise movement of the latch member 102 is limited by a stop member comprising a threaded rod 111 which is threadably mounted in a bore 113 formed through the retainer plate 112, and which is secured in an adjusted position by a suitable lock nut 114. A cam follower, in the form of a roller 115, is operatively mounted on the lower end of the latch member 102 for camming the latch member 102 in the clockwise direction, as viewed in FIG. 2, to release the latch member 102 from under the striker plate 106. The cam follower roller 115 is operatively secured to the lower end of the latch member 102 by a suitable machine screw 116. The slide latch member 102 holds the slide structure carrying the spring pressure means in a raised position, as illustrated in FIG. 2, as shown by the broken line positions of the striker plate 106a, the lift block 77a, and the push block 74a, during a blow molding operation. As illustrated in FIG. 2, the horizontal cam 117 is operatively mounted on the machine support structure of the blow molding machine for operating the cam follower roller 115 at the desired time interval during a blow molding operation.

It will be understood that any suitable stretch pin 44 and lifting and actuating structure may be used in carrying out the principles of the invention. However, the aforedescribed stretch pin 44 and lifting and actuating structure are preferable and are illustrated and described in detail, together with a suitable cam means for lowering the stretch pin 44, in the aforementioned U.S. patent application entitled "Rotary Stretch Blow Molding Apparatus", in FIGS. 2–6, 8–10, 13–16, 21–24, 29 and 45–52 thereof, and the disclosure of said Figures and the written description relating thereto are incorporated herein by reference.

In use, the stretch pin apparatus shown in FIG. 1 is moved into vertical operative relationship with a mold assembly 11. The mold assembly 11 is closed and the stretch pin 44 is actuated upwardly or inwardly of the mold assembly 11 for stretching the preform 24 during a blow molding operation. If a preform 24 has been loaded onto the stretch pin 44, it is moved upwardly from the broken line position shown in FIG. 3 into seating engagement in the mold assembly 11, so as to move the preform threaded neck shoulder 26 into seating engagement against the mold cavity shoulder 23. This seating of the preform 24 in the mold assembly 11 is effected by the upward movement of the stretch pin 44, whereby when the stretch pin 44 is in the raised position shown in FIG. 2, the push block 74 engages the lower side of the blow air body bushing 48 and moves the blow air body 30 upwardly for seating the preform 24 against the aforementioned mold cavity shoulder 23. The pressure exerted by the spring 87 on the lower end of the stretch pin 44 maintains a sealing pressure between the open end of the preform 24 and the seal 41 on the nozzle 29. After a blow molding operation, the stretch pin actuator means functions to permit the stretch pin 44 to be lowered by a suitable cam means as 154. During such downward lowering or return stroke by the stretch pin 44, the retainer ring 73 engages the inside of the bore 49 in the bushing 48 and pulls the blow air nozzle 29 downwardly to the initial starting position.

If the stretch pin 44 passes through the appropriate preform loading operation without having a preform 24 loaded thereon, the stretch pin 44 automatically moves into alignment with a mold assembly 11 and where it is moved upwardly to the raised position 44a without affecting any useful blow molding operation. Heretofore, in the operation of the prior art stretch pin assemblies under such circumstances, blow air would be admitted into the stretch pin assembly and into the mold assembly 11, thereby creating a loss of high pressure blow air and also creating objectionable noise levels which exceed the noise level standards of the Federal Occupational Safety and Health Act. The structure of the present invention overcomes the aforementioned disadvantages of the prior art blow molding stretch pin assemblies by providing means for shutting off the high pressure blow air in the event that a preform 24 is not loaded onto a stretch pin assembly.

In the event a preform 24 is not loaded onto the stretch pin 44, the stretch pin actuator means lift block 77 will engage the push block 74 on the stretch pin 44 and raise the stretch pin 44 within the mold assembly 11. However, due to the absence of a preform 24 on the stretch pin 44, the push block 74 will engage the lower end of the blow air nozzle bushing 48 that is carried on the lower end of the blow air nozzle body 30, and the blow air nozzle body 30 will be raised upwardly to the position shown in FIG. 5. The last described action causes the annular groove 56 on the blow air nozzle body 30 to be moved upwardly beyond the lower end 37 of the bushing 34 so as to close off the flow of blow air into the passages 55, the bore 47 and the mold assembly 11. The last described valving action eliminates the loss of blow air, and it also eliminates the aforementioned objectionable noise levels. After the usual blow mold cycle has been completed, the stretch pin 44 moves downwardly and the retainer ring 73 engages the inner end of the bore 49 into the bushing 48 and returns the air nozzle 29 to its initial position.

It will be seen that the embodiment of FIGS. 1 through 5 provides a positive seal, when a preform 24 is present on a stretch pin 44, between the open end of the preform 24 and the seal 41, and that it also functions to locate a preform 24 against the shoulder 23 in the mold assembly 11. The embodiment of FIGS. 1 through 5 provides a positive actuation of the blow air nozzle 29 both when a preform 24 is present on the stretch pin 44 as well as in the absence of a preform 24.

FIGS. 6, 7 and 8 illustrate a second embodiment of the invention wherein the blow air nozzle is operated by the pressurized blow air. The various parts of the embodiment of FIGS. 6, 7 and 8 which are the same as the embodiment of FIGS. 1 through 5 have been marked with the same reference numerals followed by the small letter b. The embodiment of FIGS. 6 through 8 would be incorporated in each of the stretch pin assemblies of a multistation blow molding apparatus of the type shown and described in the aforementioned copending application, and the stretch pin 44b would be raised and lowered in the same manner as described hereinbefore for the first embodiment of FIGS. 1 through 5. However, the stretch pin actuator means would only provide the sealing motion and pressure, and the valve function actuated by air pressure with a spring return, as described in full hereinafter.

The second embodiment of FIGS. 6–8 is shown as being vertically disposed for use in the same manner as the embodiment of FIGS. 1–5. As shown in FIG. 6, the stretch pin guide bushing 48b for the lower end of the stretch pin 44b is formed separately from the blow air nozzle 29b. The guide bushing 48b is movably seated in the valve body bore 31b, and it is shown as positioned against a shoulder 126 that is formed at the junction of the valve body bore 31b and a reduced diameter valve body bore 127. A suitable annular sealing member 128 is seated in a groove formed around the guide bushing bore 51b so as to sealingly engage the outer periphery of the stretch pin 44b.

As shown in FIG. 6, the blow air nozzle body 30b is provided with a stepped, cylindrical periphery comprising a large diameter periphery 129 that is slidably and rotatably mounted within the bore of the bushing 34b. The lower or rear end portion of the blow air nozzle body 30b is provided with a cylindrical reduced diameter periphery 130. A spring guide member, generally indicated by the numeral 131, is slidably mounted on said reduced diameter periphery 130 on the blow air nozzle body 30b and it is retained against longitudinal movement downwardly or rearwardly by a retainer ring 135. The spring guide 131 is inverted T-shaped in cross section elevation, as shown in FIG. 6, and includes a cylindrical body portion 132 and an integral, outwardly extended transverse flange 133. A coil spring 134 is operatively mounted within the bore 33b in the valve body 32b, and it is disposed with its upper or outer end in abutment with the lower or inner end 37b of the bushing 34b, and with its lower or inner end in abutment with the flange 133 so as to normally bias the flange 133 into seating engagement against the retainer ring 135. As shown in FIG. 6, the coil spring 134 functions as a return spring for retaining the blow air nozzle 29b in the position shown in FIG. 6, for the reception of the preform 24b for a blow molding operation.

As shown in FIG. 6, the front end 136 of the spring guide body portion 132 is disposed downwardly or inwardly from the bores 55b and from the upper or front end of the valve body periphery 130, so as to form an annular groove 56b that communicates the bore 33b with the plurality of blow air passages 55b.

As shown in FIG. 6, the spring guide flange 133 is slidably mounted in the enlarged valve body bore 33b so as to form a piston chamber structure. The space below or inwardly of the spring guide flange 133 in the bore 33b and the space in the bore 31b below the blow air nozzle body 30b forms an air cylinder chamber 137.

In use, the stretch pin apparatus shown in FIG. 6 is moved into vertical operative relationship with the mold assembly 11, and the mold assembly is closed and the stretch pin 44b is actuated upwardly or inwardly of the mold assembly 11 in the same manner as the aforedescribed embodiment of FIGS. 1 through 5. If a preform 24b has been loaded onto the stretch pin 44b, a normal blow molding operation will occur. Blow air under pressure from a suitable source will flow through the inlet bore 57b and into the valve body bores 31b and 33b. The preform 24 is moved upwardly into seating engagement in the mold assembly by the upward movement of the stretch pin 44b. The push block 74 engages the lower end of the guide bushing 48b and moves it upwardly into engagement with the blow air nozzle 29b. The sealing pressure against the preform 24b is thus effected by the stretch pin actuator mechanism. The blow air does not produce the sealing pressure.

If the stretch pin 44b is not provided with a preform 24b during the appropriate preform loading operation, the blow air nozzle 29b is moved upwardly, as viewed in FIG. 7, since the blow air pressure behind the flange 133 and the blow air nozzle body 30b in the air cylinder chamber 137 will move the blow air nozzle 29b through a valve shut-off movement, to the position shown in FIG. 7. As shown in FIG. 7, when the blow air valve nozzle 29b is in the valve shut-off position, the upper or front end 136 of the spring guide 131 seats against the lower or rear end of the guide bushing 34, so as to shut off communication between the valve body bore 33b and the annular groove 56b. The last-mentioned shut-off action prevents loss of pressurized blow air through the upper end of the blow air nozzle bore 47b, with a resultant elimination of the noise which would normally occur if such blow air were allowed to escape from the bore 47b due to the absence of a preform 24b.

FIGS. 9, 10 and 11 illustrate a third embodiment of the invention wherein the blow air nozzle is operated by the pressurized blow air. The valve parts of the embodiment of FIGS. 9, 10 and 11 which are the same as the first two embodiments have been marked with the same reference numerals followed by the small letter c. The embodiment of FIGS. 9, 10 and 11 would be incorporated in each of the stretch pin assemblies of a multistation blow molding apparatus of the type shown and described in the aforementioned copending application, and the stretch pin 44c would be raised and lowered in the same manner as described hereinbefore for the first embodiment of FIGS. 1 through 5. However, the stretch pin actuator means would not function to move the blow air nozzle 29c, since it is operated by the blow air under pressure, as described more fully hereinafter.

The third embodiment of FIGS. 9 through 11 is shown as being vertically disposed for use in the same manner as the embodiment of FIGS. 1 through 5. FIG. 9 shows the structure of the third embodiment in an operative position for blow molding a preform 24c. FIG. 10 shows the structure of the third embodiment in a position wherein the blow air nozzle 29c has been moved through a shut-off movement for closing off the flow of blow air due to the absence of a preform 24c.

As shown in FIG. 9, the stretch pin guide bushing 48c for the lower end of the stretch pin 44c is formed separately from the flow air nozzle 29c. The stretch pin guide bushing 48c is constructed and arranged to function as a closure plate for the lower or rear open end of a valve body large bore 144, and it is secured in place on the valve body 32c by suitable machine screws 141. The stretch pin 44c extends through the guide bore 51c formed through the guide bushing 48c. A suitable annular sealing member 128c is seated in a groove formed around the guide bushing bore 51c so as to sealingly engage the outer periphery of the stretch pin 44c.

As shown in FIG. 9, the blow air nozzle body 30c is provided with a stepped, cylindrical periphery comprising a large diameter periphery 145 on the lower or rear end thereof and a smaller diameter periphery 139 on the upper or front end thereof. The upper end smaller diameter periphery 139 is slidably and rotatably mounted in the bore 142 formed in the upper end of the valve body 32c. A suitable annular sealing member 143 is seated in a groove formed around the valve body bore 142 so as to sealingly engage the outer periphery of the blow air nozzle periphery 139. The large diameter lower end periphery 145 of the blow air nozzle body 30c is slidably and rotatably mounted in an enlarged valve body bore 144 which communicates with the bores 33c, 140 and 142 in the valve body 32c.

As shown in FIGS. 9 and 11, a plurality of circumferentially disposed, longitudinally extended air passage slots 148 are formed in equally spaced apart positions around the periphery of the large diameter portion 148 of the blow air nozzle body 30c. A coil spring 134c is operatively mounted within the bores 144, 33c and 140. The upper or outer end of the spring 134c is seated against a shoulder 146 that is formed at the junction of the bores 140 and 142. The lower end of the spring 134c is seated around the stepped periphery portion 151 of the blow air nozzle body 30c, and it abuts the shoulder 147 that is formed by the junction of the blow air nozzle body peripheries 151 and 145. The coil spring 134c functions as a return spring for retaining the blow nozzle 29c in the position shown in FIG. 9 for the reception of a preform 24c for a blow molding operation.

In use, the stretch pin apparatus shown in FIG. 9 is moved into vertical operative relationship with the mold assembly 11, and said mold assembly is closed and the stretch pin 44c is actuated upwardly and inwardly of the mold assembly 11 in the same manner as the aforedescribed embodiment of FIGS. 1 through 5. If a preform 24c has been loaded onto the stretch pin 44c, a normal blow molding operation occurs. Blow air under pressure from a suitable source will flow into the inlet port 149 (FIG. 11) and into the air passage bore 150. The blow air flows from the bore 150 into the bore 33c in the valve body 32c and through the annular groove 56c, the passages 55c, the bore 47c and into the preform 24c for a blow molding operation.

The pressurized blow air also flows from the bore 33c into the bore 144 and through the air passage slots 148 to a position below or behind the blow air nozzle body 30c in the air chambers 137c. The blow air acting on the lower end of the nozzle body 30c creates a force on the blow air nozzle 29c so as to move it upwardly, as viewed in FIG. 9, to provide an efficient sealing action between the sealing member 41c and the open end or throat of the preform 24c. Since the blow air within the preform 24c is acting on a total area on the upper end of the nozzle body 30c which is smaller than the total area on which the blow air is acting on the lower end of the nozzle body 30c, the upward force exerted on the nozzle body 30c is greater than the downward force so that the aforementioned sealing action is effected.

If a stretch pin 44c is not provided with a preform 24c during the appropriate loading operation, the blow nozzle 29c is moved upwardly, as viewed in FIG. 10, since the blow air pressure below the nozzle body 30c will move the nozzle 29c through a valve shut-off movement to the position shown in FIG. 10. When the blow air valve nozzle 29c is in the valve shut-off position of FIG. 10, the annular groove 56c is moved upwardly within the valve body bore 142 so as to close all communication between the valve body bore 33c and the annular groove 56c. The last-mentioned shut-off action prevents loss of pressurized blow air and eliminates noise caused by air escaping from the bore 47c if such air were allowed to escape due to the absence of a preform 24c.

FIG. 12 illustrates a fourth embodiment of the invention wherein the blow air nozzle is operated by the pressurized blow air. The various parts of the embodiment of FIG. 12 which are the same as the first three embodiments have been marked with the same reference numerals followed by the small letter d. The embodiment of FIG. 12 would be incorporated in each of the stretch pin assemblies of a multistation blow molding apparatus in the same manner as the first and third embodiments of FIGS. 6–8 and 9–11, respectively.

The embodiment of FIG. 12 is substantially similar to the third embodiment of FIGS. 9 through 11, and the principal difference is in the form of the guide bushing 48d for the lower end of the stretch pin 44d. In the third embodiment of FIGS. 9 through 11, the last-mentioned guide bushing 48c was made in the form of a closure plate, whereas in the embodiment of FIG. 12 the guide bushing 44d is inverted T-shaped in cross section elevation.

As shown in FIG. 12, the stretch pin guide bushing 48d includes a cylindrical body portion 152 which is adapted to be slidably mounted within the valve body bore 144d. The stretch pin guide bushing 48d also includes an integral, transverse flange 153 on the lower end thereof which is secured to the valve body 32d by a plurality of suitable machine screws 41d. A suitable annular sealing member 128d is seated in a groove formed around the bore 51d formed through the guide bushing 48d so as to sealingly engage the outer periphery of the stretch pin 44d.

In use, the embodiment of FIG. 12 would function in the same manner as described hereinbefore for the third embodiment of FIGS. 9 through 11.

It will be seen from the foregoing that the present invention provides a movable blow air nozzle for locating a preform in a blow mold assembly and wherein the nozzle is free to rotate and to be moved axially as a piston. The blow air nozzle can be moved axially by either a mechanical means or air pressure means to seal a preform in a mold assembly for a blow molding operation; or, if no preform is present, to move an additional distance and function as a valve to shut off the blow air. The present invention provides a structure for preventing loss of high pressure blow air if no preform is loaded on a stretch pin assembly and for eliminating the resultant noise in the absence of a preform. The present invention thus overcomes a noise environmental problem which is inherent in the prior art blow molding machines.

While is will be apparent that the preferred embodiments of the invention herein disclosed are well calculated to fulfill the objects above stated, it will be appreciated that the invention is susceptible to modification, variation and change.

We claim:

1. In a blow molding machine having a mold assembly with a locating shoulder therein and a stretch pin assembly mounted in operative relation with said mold assembly, the combination comprising:
   a. a tubular valve body in said stretch pin assembly;
   b. a longitudinally movable blow air nozzle means slidably mounted in said valve body for carrying a preform and locating and sealing a preform against said shoulder in the mold assembly;
   c. a blow molding stretch pin movably mounted longitudinally through said blow air nozzle means for stretching a preform mounted on said blow air nozzle means;
   d. a blow air passage means operatively formed through said tubular valve body and blow air nozzle means for admitting blow air under pressure into a preform on said blow air nozzle means in said mold assembly for blowing the preform into a finished article;

e. means cooperating with said blow air nozzle means for longitudinally moving said blow air nozzle means in said tubular valve body in one direction into an initial position at which a preform is loaded onto the blow air nozzle means; and f. means operatively connected to said blow air nozzle means for longitudinally moving said blow air nozzle means in said tubular valve body in the opposite direction a first distance to locate and seal a preform carried thereon against said shoulder in the mold assembly, and for longitudinally moving said blow air nozzle means a second distance in said opposite direction beyond said first distance for shutting off said blow air passage means in the absence of a preform on the blow air nozzle means during operation of the blow modling machine.

2. In a blow molding machine, the structure as defined in claim 1, wherein:

a. said means for longitudinally moving said blow air nozzle means in said one direction into said initial position includes a mechanical means.

3. In a blow molding machine, the structure as defined in claim 2, wherein:

a. said means for longitudinally moving said blow air nozzle in said one direction into said initial position includes a cam means.

4. In a blow molding machine, the structure as defined in claim 2, wherein:

a. said means for longitudinally moving said blow air nozzle means in said opposite direction includes a mechanical means.

5. In a blow molding machine, the structure as defined in claim 3, wherein:

a. said mechanical means comprises a stretch pin mechanically operated actuator means for operating said stretch pin.

6. In a blow molding machine, the structure as defined in claim 5, wherein said stretch pin actuator means includes:

a. a spring biased lift means engageable with the stretch pin;

b. means for carrying said spring biased lift means;

c. means for moving said spring biased lift means to move the stretch pin; and, d. means for releasably retaining said spring biased lift means in a raised position to retain a stretch pin in a raised molding position.

7. In a blow molding machine, the structure as defined in claim 5, wherein:

a. said blow air nozzle means includes a nozzle body for guiding said stretch pin, and said nozzle body has a nozzle nose on one end thereof on which a preform is carried; and, b. a stretch pin guide bushing is detachably mounted on the other end of said nozzle body for guiding said stretch pin.

8. In a blow molding machine, the structure as defined in claim 2, wherein:

a. said means for longitudinally moving said blow air nozzle means in said one direction into said initial position includes a spring means.

9. In a blow molding machine, the structure as defined in claim 8, wherein:

a. said means for longitudinally moving said blow air nozzle means in said opposite direction includes a pneumatic means.

10. In a blow molding machine, the structure as defined in claim 9, wherein:

a. said blow air nozzle means includes a nozzle body movably mounted in one end of a bore in said tubular body for guiding said stretch pin, and said nozzle body has a nozzle nose on the outer end thereof on which a preform is carried; out, b. a stretch pin guide bushing is detachably mounted over the other end of said bore in said tubular valve body to close said bore and form an air cylinder chamber between the guide bushing and the blow air nozzle body.

11. In a blow molding machine, the structure as defined in claim 10, wherein:

a. said blow air passage means communicates with said air cylinder chamber for conducting blow air under pressure into said cylinder chamber for longitudinally moving said blow air nozzle means in said opposite direction.

12. In a blow molding machine, the structure as defined in claim 11, wherein:

a. said blow air passage means includes a bore in said tubular valve body and a plurality of transverse bores in said blow air nozzle body which communicate with said last named bore in said valve body when said blow air nozzle means is in said initial position and when said blow air nozzle means has been moved in said opposite direction through said first distance, and when said blow air nozzle means has been moved in said opposite direction through said second distance, said plurality of transverse bores are moved out of said last named valve body bore to shut off communication with said bore and blow air passage means.

13. In a blow molding machine, the structure as defined in claim 9, wherein:

a. said blow air nozzle means includes a nozzle body movably mounted in one end of a bore in said tubular body for guiding said stretch pin, and said nozzle body has a nozzle nose on the outer end thereof on which a preform is carried; and, b. a stretch pin guide bushing is detachably mounted in the other end of said bore in said tubular valve body in a position to form an air cylinder chamber between the guide bushing and the blow air nozzle body.

14. In a blow molding machine, the structure as defined in claim 13, wherein:

a. said blow air passage means communicates with said air cylinder chamber for conducting blow air under pressure into said cylinder chamber for longitudinally moving said blow air nozzle means in said opposite direction.

15. In a blow molding machine, the structure as defined in claim 14, wherein:

a. a first valve element having a transverse valve surface is releasably secured in said tubular valve body; and, b. a second valve element having a transverse valve surface is operatively carried on said blow air nozzle body, whereby when said blow air nozzle means is in said initial position and when said blow air nozzle means has been moved in said opposite direction through said first distance, said valve elements are spaced apart to allow flow of blow air through said blow air passage means, and when said blow air nozzle means has been moved in said opposite direction through said second distance, said second valve element is moved to a position to engage said valve element transverse valve surfaces to shut off flow of blow air through said blow air passage means.

16. In a blow molding machine, the structure as defined in claim 14, wherein:
   a. said blow air passage means communicating with said air cylinder chamber includes passage means formed through said blow air nozzle body.

17. In a blow molding machine, the structure as defined in claim 16, wherein:
   a. said blow air passage means includes a bore in said tubular valve body and a plurality of transverse bores in said blow air nozzle body which communicate with said last named bore in said valve body when said blow air nozzle means is in said initial position and when said blow air nozzle means has been moved in said opposite direction through said first distance, and when said blow air nozzle means has been moved in said opposite direction through said second distance, said plurality of transverse bores are moved out of said last named valve body bore to shut off communication with said bore and blow air passage means.

* * * * *

UNITED STATES PATENT OFFICE
CERTIFICATE OF CORRECTION

Patent No. 3,993,427        Dated November 23, 1976

Inventor(s) Ivan L. Kauffman et al.

It is certified that error appears in the above-identified patent and that said Letters Patent are hereby corrected as shown below:

Column 2, line 37, after "principles" insert --- of ---.
Column 10, line 49, before "air" delete "flow" and insert ---- blow ----.
Column 14, claim 10, line 10, after "carried" delete "out," and insert ---- and, ----.

Signed and Sealed this

Twelfth Day of April 1977

[SEAL]

Attest:

RUTH C. MASON
*Attesting Officer*

C. MARSHALL DANN
*Commissioner of Patents and Trademarks*